Oct. 15, 1940.　　　　J. LESHIN　　　　2,217,910
VANITY CASE
Filed Sept. 23, 1938
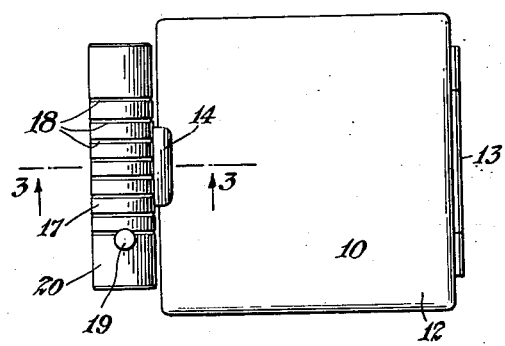
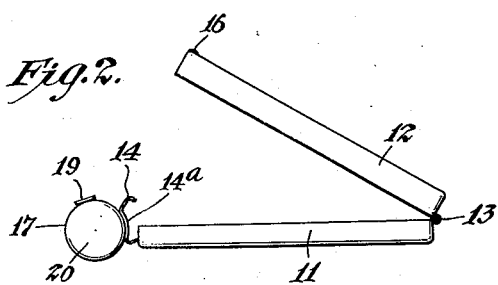
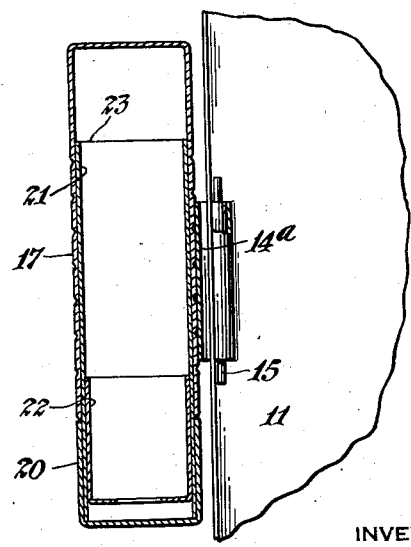
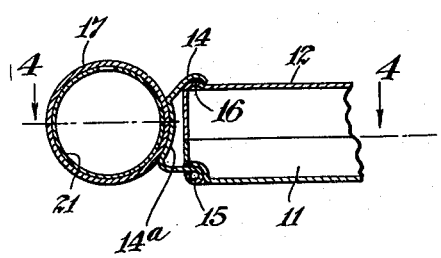
INVENTOR
Joseph Leshin
BY
ATTORNEY Patented Oct. 15, 1940

2,217,910

UNITED STATES PATENT OFFICE 2,217,910

VANITY CASE

Joseph Leshin, Bronx, N. Y., assignor to Majestic Metal Specialties, Inc., Moosup, Conn., a corporation of Connecticut Application September 23, 1938, Serial No. 231,287

1 Claim. (Cl. 132—82)

This invention relates to vanity cases and has for its object to provide a simple, attractive, and efficient device of this type. Another object is to provide a vanity case capable of being easily opened and closed. A further object is to provide a vanity case having a latch easily opened and located on the outside instead of on the inside of the case.

Many vanity cases have small thumbnail slides or push buttons for actuating a spring pressed latch in opening the vanity case. Such a device is difficult to operate at times. According to this invention these disadvantages have been eliminated and a large size handle provided for a latch located on the outside of the vanity case.

Referring to the drawing, Fig. 1 is a top plan view of one embodiment of this invention. Fig. 2 is a side view of the device of Fig. 1, showing the vanity case partially open.

Fig. 3 is an enlarged section on the line 3—3 of Fig. 1.

Fig. 4 is a section on the line 4—4 of Fig. 3.

A vanity case 10 of any convenient and well known type includes a body portion 11 and a cover or top portion 12, hinged together at 13 to enable the two portions of the casing to be opened for use. For holding the two portions together in closed position a latch 14 is located on the outside of the vanity case, being pivoted at 15 to the bottom portion 11. Any convenient type of projection and recess connection or any well known type of yieldable connection may serve to hold a latch in its closed position. In the embodiment illustrated, the cover portion 12 is provided with a small ridge or projection 16 over which an end of the latch is adapted to yieldably engage, this end portion of the latch being recessed as shown in Fig. 3 to fit over the ridge. Preferably the latch itself is capable of flexing sufficiently to enable the recessed portion to be flexed over the ridge 16.

Secured to the bridge portion 14a of the latch, preferably by soldering, is a tubular handle part 17, which may if desired, be provided with a number of grooves 18 for purposes of ornamentation and to assist in enabling the operator to get a better grip on the handle. At one end of the tubular handle is located a removable portion 20, soldered or otherwise secured around the base of the tubular casing 21, telescoping within the outer part of the tubular handle 17. The casing 21 contains a lipstick carrier 22 slidable therein by means of an actuator button 19 which slides in a longitudinal slot in the casing 21 and is secured to the carrier 22 for moving the carrier toward and from the open end portion 23 of the casing 21, as is common in the art of lipstick holders.

In operation the latch is opened by simply pressing the tubular handle portion to rotate it in a counter-clockwise direction as shown in Fig. 3. After releasing the cover portion 12, the tubular handle 17 may be swung about its pivot until it is moved through almost 180 degrees or until the latch or handle contacts with the bottom of the body portion 11. After being opened the vanity case is used in the usual manner, it containing powder, rouge or whatever is desired. After closing the vanity case the latch 14 is swung about its pivot 15 until the recessed end portion snaps over the ridge 16. This ridge provides double cam surfaces to facilitate the latching engagement, the latch flexing the desired amount to enable its recessed portion to engage the ridge or projection 16.

After the vanity case has been closed the portion 20 may be grasped and withdrawn, pulling the inner casing 21 out of the tubular handle portion. When it has been removed the actuator button 19 may be slid toward the open end 23 of the casing 21, raising the carrier 22 and causing the lipstick material to be projected for use. After use the actuator button is slid toward the base or cover portion 20 retracting the carrier to the position shown in Fig. 4. The removable lipstick holder may then be put back into the tubular handle 17, the casing 21 telescoping yet freely sliding within the tubular handle. When the cover portion 20 has been moved to the position shown in Figs. 1 and 4, the friction fit of the casing 21 within the handle 17 enables the actuator button 19 to be held between the cover portion 20 and the adjacent end of the tubular handle 17. The removable lipstick holder portion may be inserted in the handle 17 with the actuator button 19 in any desired angular position such as that shown in Fig. 1, or with the button moved substantially any angular amount therefrom in either direction, since the tubular handle portion 17 is preferably not slotted but only the cover portion 20 and the inner casing 21 to receive the actuator button. The lipstick holder may also be conveniently used in the above described manner when the vanity case is open as well as closed.

I claim:

A vanity case having a cover, a hinge connecting said case and cover along one side, an end wall closing said case on the side opposite said hinge, a handle of generally tubular shape carried by and spaced from the vanity case on the outside of said end wall and substantially parallel therewith, whereby said handle may be of larger diameter or thickness than it could if it were located within said vanity case with the cover closed, a latch adjacent the handle and carried by said case for engagement with a portion of the cover when closed to retain the cover against opening, said latch being yieldable in response to relative movement bodily between the handle and case for releasing the cover, and said handle having an end portion longitudinally removable without being obstructed by said case or cover and without the necessity for any movement of the handle.

JOSEPH LESHIN.